United States Patent
Abe et al.

(10) Patent No.: US 6,946,177 B2
(45) Date of Patent: Sep. 20, 2005

(54) ADHESIVE COMPOSITION AND ADHERED STRUCTURE WHICH THERMALLY PEELED WITH EASE

(75) Inventors: Hidetoshi Abe, Yamagata (JP); Yorinobu Takamatsu, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 1 day.

(21) Appl. No.: 10/333,368

(22) PCT Filed: Jul. 19, 2001

(86) PCT No.: PCT/US01/22785

§ 371 (c)(1),
(2), (4) Date: Jan. 16, 2003

(87) PCT Pub. No.: WO02/10299

PCT Pub. Date: Feb. 7, 2002

(65) Prior Publication Data

US 2004/0037990 A1 Feb. 26, 2004

(30) Foreign Application Priority Data

Jul. 31, 2000 (JP) .......................... 2000-230945

(51) Int. Cl.[7] .......................... B32B 33/00; B32B 15/04; B32B 7/12
(52) U.S. Cl. .................... 428/40.1; 428/40.1; 428/40.2; 428/343; 428/355 R
(58) Field of Search ............... 428/40.1, 41.5, 428/40.2, 41.9, 343, 355 RA, 355 R

(56) References Cited

U.S. PATENT DOCUMENTS 5,192,612 A 3/1993 Otter et al. .................. 428/355
5,412,035 A 5/1995 Schmitt et al. ............... 525/93

FOREIGN PATENT DOCUMENTS

WO 96/05264 2/1996
WO 01/34716 5/2001

OTHER PUBLICATIONS

CAPA 2043 Polycaprolactone Product Safety Information, Oct. 15, 2001.*
JP59–096160 (abstract) Jun. 2, 1984;Database WPI Section Ch. Week 198428 Derwent Publications Ltd., London GB; An 1984–174015 XP002191698.
JP06–145621 (abstract) Sep. 17, 2001; Database WPI Section Ch Week 200156 Derwent Publications Ltd., London, GB; AN 1994–210967 XP002191699.

* cited by examiner

*Primary Examiner*—Harold Pyon
*Assistant Examiner*—Patricia L. Nordmeyer
(74) *Attorney, Agent, or Firm*—Colene H. Blank

(57) ABSTRACT

An adhesive composition containing (i) from 55 to 95 wt. % of a tackifying polymer and (ii) from 4 to 40 wt. % of a crystalline polycaprolactone polymer based on a total weight of the composition is disclosed. The tackifying polymer is a polymer (i) that is compatible with the polycaprolactone at a first temperature equal to or greater than the melting point of the polycaprolactone, and (ii) is crosslinked at the first temperature.

20 Claims, No Drawings

ADHESIVE COMPOSITION AND ADHERED STRUCTURE WHICH THERMALLY PEELED WITH EASE

FIELD OF THE INVENTION

The present invention relates to an adhesive composition having thermally easy-peeling properties, which comprises a tackifying polymer and polycaprolactone as a crystalline polymer. In particular, the present invention relates to the improvement of an adhesive composition which will be in an easily peelable condition when it is heated to a temperature higher than the melting point of the crystalline polymer on any desired occasion after it is adhered to an adherent, so that the peel strength is decreased to a value smaller than that prior to heating. Such an adhesive composition is particularly useful as an adhesive used in an adhesive layer of an adhesive sheet.

BACKGROUND OF THE INVENTION

Some publications disclose adhesive compositions which control the adhesion properties as desired by the use of a tackifying polymer having pressure-sensitive adhesion properties, and a crystalline polymer in combination.

For example, U.S. Pat. No. 5,192,612 (=JP-B-3021646) discloses a pressure-sensitive composition comprising a pressure-sensitive adhesive base resin (a tackifying polymer such as an acrylic polymer), a detackifying resin and a detackifying particulate. A specific preferable example of the detackifying resin is substantially linear polycaprolactone having a molecular weight of about 3,000 to about 342,000. Polycaprolactone is a crystalline polymer which exhibits non-tackifying properties at room temperature (about 15 to 30° C.)

The above-described pressure-sensitive adhesive can be adhered to an adherent by pressing the adhesive against the adherent. The above detackifying resin and the detackifying particles effectively reduce tack on the surface of the adhesive at room temperature and improves repeelability. The repeelability means that an adhesive material can be adhered, peeled, readhered and repeeled, and the positioning or the position-adjustment is easy prior to the final adhesion. In this art field, the repeeling properties are also known as "repositionability", "slidability" (ease of sliding) or the like. The amount of the pressure sensitive adhesive base resin contained in the above pressure sensitive adhesive is preferably from 55 to 98 wt. %, while that of the detackifying resin is preferably from 1 to 30 wt. %, based on the entire weight of the adhesive. However, in the above US patent, it is not supposed that the adhesive is peeled off during or after the use, once the adhesive is finally adhered to the adherent.

The pressure sensitive adhesive disclosed in U.S. Pat. No. 5,412,035 (=JP-A-6-510548) is a pressure sensitive adhesive composition which becomes pressure sensitive at least at one temperature in the range between 20° C. and 40° C., and comprises (1) at least 50 wt. % of a polymeric pressure-sensitive adhesive component and (2) a crystalline polymer in an amount of larger than 0 wt. % and less than 50 wt. %, each based on the weight of the whole solid components. The crystalline polymer is usually non-tacky at room temperature and intimately mixed with the polymeric pressure-sensitive adhesive component.

The melting point Ta (° C.) of the crystalline polymer, which is measured in the composition, is lower than the melting point Tm (° C.) of the crystalline polymer as such, and the difference Tm−Ta is preferably from 1° C. to 9° C.

In the above US patent, Tm is preferably from 20° C. to 102° C. The disclosed adhesive composition is an adhesive having thermal repeelability, that is, a peel strength P2 (g/cm) at a certain temperature higher than Ta is smaller than a peel strength P1 (g/cm) at a certain temperature lower than Ta. Such an adhesive may be called a "thermal-peeling-easy" adhesive. The above peel strength P1 is measured at a temperature T1 in the range between (Ta−10) and (Ta−4), while the peel strength P2 is measured at a temperature in the range between (Ta+4) and (Ta+10).

That is, U.S. Pat. No. 5,412,035 teaches that the thermal-peeling-easy adhesive, which is be easily peeled off during or after the use once the adhesive is finally adhered to the adherent, can be produced through the optimum combination of the polymeric pressure-sensitive adhesive component and the crystalline polymer which is intimately mixed with the polymeric pressure-sensitive adhesive component. This US patent specification or the corresponding JP-A publication does not disclose that polycaprolactone may be used as a crystalline polymer.

JP-A-2000-119624 discloses a heat-activation adhesive comprising a specific tackifying polymer and a polyester such as polycaprolactone, etc. Using the disclosed adhesive, an article such as an electronic part or a polymer film can be adhered to an adherent by heat pressing (pressing after heating or pressing while heating). Polycaprolactone efficiently functions as a thermoplastic polymer, and the combination of polycaprolactone and the tackifying polymer having good compatibility with polycaprolactone can form a heat-activation adhesive having improved adhesion strength.

It is essential for the disclosed tackifying polymer to have two functional groups, that is, a hydroxyl group and a phenyl group, in the molecule, and the compatibility with polycaprolactone is improved by the functions of these functional groups.

With the above-described thermal-peeling-easy adhesive disclosed in U.S. Pat. No. 5,412,035, an adhered article (e.g. an adhesive sheet comprising a substrate fixed to an adhesive layer containing an adhesive, etc.) can be relatively easily peeled off from an adherent, after it is heated to a specific temperature, usually, a temperature higher than the melting point of the crystalline polymer. However, the conventional thermal-peeling-easy adhesives may be insufficient in the following properties, and thus their improvements are necessary:

(i) The easily peelable state is maintained for a specific period of time (to prolong the easily peeling time), (ii) The adhered article can be peeled off cleanly without leaving the adhesive (the polymeric components such as the tackifying polymer) on the adherent (to avoid so-called "adhesive leavings").

With the conventional adhesives, the thermal-peeling-easy effect is relatively quickly lost when the temperature of the adherent becomes lower than a certain specific temperature. For example, the adhesives recover the peel strength of substantially the same level as that prior to heating only within 2 to 3 minutes after heating.

For instance, when such an adhesive is used as the adhesive layer of an adhesive sheet to be used outdoors (e.g. exterior decorative sheets or reflection sheets for signs, etc.), and the adhesive sheet is peeled off under relatively low temperature conditions such as winter seasons, the temperature of the adherent is spontaneously lowered to a temperature less than the specific temperature before the entire sheet is peeled off.

When such as adhesive is used as the adhesive layer of an adhesive sheet having a relatively large area (usually 400 cm² or larger), the following problem may arise:

When a certain part of the adherent is heated through the adhesive sheet, and then other part of the adherent is heated, the once heated certain part starts to cool while the other part is heated. Even when the entire adhesive sheet and the adherent are uniformly heated, one part of the adhesive sheet start to cool while other part of the adhesive sheet is being peeled off.

When the above adhesive is used to adhere relatively small parts (e.g. electronic parts, etc.) to adherents (e.g. other electronic parts), the following problem may arise:

When the relatively small articles are peeled off and separated from the adherents, it is efficient to heat a plurality of the parts in an oven or the like, take them out from the oven and then remove each part from the adherent. However, if the number of the parts is large, the remaining parts are cooled while some parts are being removed from the adherent.

In any case, when the peelable time is short, the peeling work becomes difficult.

Sometimes, the articles such as the adhesive sheets or the parts should be removed from the adherents, after they are used for a relatively long time (several months or longer). When the articles are removed from the adherents after the long time use, the adhesive layer is cohesively failed, so that the adhesive layer is often left on the adherent. Such adhesive leavings should be prevented in any applications.

However, none of the above patent specifications and publications disclose any method to solve the above problems (i) and (ii).

Furthermore, U.S. Pat. No. 5,412,035 does not disclose a thermal-peeling-easy adhesive which can be readhered after peeling. Readhesion properties are important properties when the adherents are changed, or the position of the adhesion on the adherent surface is changed. In such applications, adhesives, which can be easily readhered only by pressing, are very advantageous.

Thus, one object of the present invention is to provide a thermal-peeling-easy adhesive composition, (1) which achieves the easily peelable state by heating it to a specific temperature to decrease the peel strength to a value smaller than that prior to heating, on a desired occasion after it is adhered to an adherent, (2) which can maintain such an easily peelable state for a certain period of time, (3) which can be peeled off without leaving the adhesive on the adherent, and (4) which can be easily readhered to an adherent (including other adherent) after peeling.

SUMMARY OF THE PRESENT INVENTION

To solve the above problems, the present invention provides an adhesive composition comprising (I) a tackifying polymer and (II) a crystalline polymer, wherein the content of said tackifying polymer is from 55 to 95 wt. % based on the whole weight of the composition, and the content of said crystalline polymer is from 4 to 40 wt. % based on the whole weight of the composition, characterized in that said crystalline polymer comprises polycaprolactone, and said tackifying polymer comprises a polymer which is compatible with said polycaprolactone when the composition is heated to the melting point of said polycaprolactone and is crosslinked.

DESCRIPTION OF THE PREFERRED EMBODIMENT(S)

Similar to the above-described conventional thermal-peeling easy adhesive compositions, the adhesive composition of the present invention contains (I) the tackifying polymer and (II) the crystalline polymer, and their contents are 55 to 95 wt. %, and 4 to 40 wt. %, respectively, based on the while weight of the composition.

The characteristics and properties of the adhesive composition of the present invention include:

(1) that the crystalline polymer comprises polycaprolactone, (2) that the tackifying polymer comprises a polymer which is compatible with polycaprolactone when the composition is heated to the melting point of said polycaprolactone, and (3) that the polymer compatible with polycaprolactone is crosslinked.

Because of these characteristics, the present invention can provide the thermal-peeling-easy adhesive composition, (a) that can improve the thermal-peeling-easy properties that achieve the easily peelable state by heating it to a specific temperature to decrease the peel strength to a value smaller than that prior to heating, on a desired occasion after it is adhered to an adherent, (b) that can maintain such an easily peelable state, and prolong the easily peelable time to a desired period of time, (c) that can improve the removal cleanliness, that is, it can be peeled off without leaving the adhesive on the adherent, and (d) that can improve the readhesion properties, that is, after peeling, it can be easily readhered to an adherent by pressing it to the adherent.

The first property, that is, the inclusion of polycaprolactone as the crystalline polymer effectively contributes to, in particular, the effect described in (a) above.

Polycaprolactone easily melts when it is heated to a temperature not lower than its melting point and becomes compatible with the tackifying polymer so that it increases the peeling easiness. Furthermore, since polycaprolactone is a non-tackifying polymer, it increases the removal cleanliness, and avoids the adhesive leavings on the adherent surface after peeling.

The second property contributes to, in particular, the effects (b) and (d) above. That is, since the tackifying polymer is compatible with the molten polycaprolactone, the crystallization (recrystallization) of polycaprolactone can be retarded after heating. In addition, the melting and recrystallization of polycaprolactone in the adhesive composition are substantially reversible physical changes (phenomena). Thus, the composition can restore substantially the same state as that prior to heating, when and after it is readhered subsequent to the heating of the composition. Furthermore, the composition can be again peeled off after it is readhered.

As will be explained in detail later, the adhesion composition of the present invention can be adhered by pressing even at room temperature (about 15 to 30° C.). In addition, it can be adhered by heat pressing, when the content of the tackifying polymer is relatively small, or it is adhered to an adherent to which the adhesion of an adhesive is difficult. Furthermore, the adhesive composition may be readhered to the adherent while it is not cooled after the thermal peeling.

The third property contributes to, in particular, the effect described in (c) above. Since the cohesive force is effectively increased by the crosslinking, the leaving of the tackifying polymer on the adherent can be avoided when the adhesive composition is peeled off. In the peeling-easy state, polycaprolactone is intimately mixed with the crosslinked tackifying polymer. Thus, the adhesive leavings of the entire adhesive composition can be prevented without requiring the crosslinking of polycaprolactone, which will prevent the melting and recrystallization of polycaprolactone.

From such a viewpoint, it is preferable to use a crosslinking component which does not substantially chemically react with polycaprolactone, when the adhesive composition further comprises a crosslinking component (crosslinking agent). Since polycaprolactone usually has hydroxyl groups at both polymer ends, the tackifying polymer preferably has a functional group other than hydroxyl groups (e.g. a carboxyl group, etc.) as a crosslinkable functional group reactive with the crosslinking component. Such a functional group and such a crosslinking composition will be explained below.

To achieve the above effects of the present invention, the content of the tackifying polymer is in the range between 55 and 95 wt. % based on the whole weight of the adhesive composition. When the content of the tackifying polymer is less than 55 wt. %, in particular, the effect (d) may not be attained. When this content exceeds 95 wt. %, in particular, the effects (a) and (b) may not be attained.

Meanwhile, the content of the crystalline polymer is in the range between 4 and 40 wt. % based on the whole weight of the adhesive composition. Generally, when the content of the crystalline polymer is less than 4 wt. %, in particular, the effects (a) through (c) may not be attained. Furthermore, when this content exceeds 40 wt. %, in particular, the effect (d) may not be attained.

From such viewpoints, the content of the tackifying polymer is preferably from 60 to 94 wt. %, more preferably from 65 to 90 wt. %, and the content of the crystalline polymer is preferably from 5 to 35 wt. %, more preferably from 9 to 32 wt. %.

Polycaprolactone

Polycaprolactone used in the present invention may be any polycaprolactone, insofar as it is substantially non-tacky at room temperature (about 25° C.), and it has crystallinity such that it can be molten by heating. Polycaprolactone may be (i) one obtained by polymerizing a starting material containing caprolactone, or (ii) one having recurring units obtained by ring opening polymerization of caprolactone.

In the case of an adhesive composition comprising the tackifying polymer and polycaprolactone, it is possible to substantially suppress the tackiness at room temperature by the crystallization of polycaprolactone. However, the composition can exhibit the desired level of adhesion force by pressing the adhesive composition to the adherent at room temperature or an elevated temperature. When the higher adhesion force is required, the composition may be heat pressed.

The melting point of polycaprolactone may depend on its molecular weight, and is usually in the range between 30 and 70° C., preferably in the range between 35 and 65° C., in particular in the range between 40 and 60° C.

The molecular weight of polycaprolactone may not be limited insofar as the adhesive composition can exhibit the desired adhesion force. In general, its weight average molecular weight is from 1,000 to 100,000, preferably from 2,000 to 50,000, in particular from 3,000 to 40,000. When the molecular weight is too small, the adhesion force tends to decrease. When the molecular weight is too large, the compatibility of polycaprolactone with the tackifying polymer may deteriorate, so that the above-described intended effects may not be attained.

The adhesive composition of the present invention may contain a crystalline polymer other than polycaprolactone, insofar as the effects of the present invention may not be impaired.

In addition, a urethane-modified polymer, that is chain-extended by the reaction of a diisocyanate compound and polycaprolactone, may be used, insofar as the effects of the present invention are not impaired.

Tackifying Polymer

The tackifying polymer used in the present invention is a polymer which is tacky at room temperature (about 25° C.), and includes a crosslinkable polymer which is compatible with the above-described polycaprolactone when it is heated to a temperature not lower than the melting point of polycaprolactone. The tackifying polymer should be crosslinked, when the adhesive composition is used as a thermal-peeling-easy adhesive according to the present invention.

Whether the tackifying polymer is compatibilized with polycaprolactone when heated to a temperature not lower than the melting point of polycaprolactone can be determined with the clarity of the adhesive composition, that is, the change (decrease) of haze. For example, the transparency of a film adhesive (a film-form adhesive) consisting of the adhesive composition of the present invention and having a thickness of 30 to 60 $\mu$m is compared between the heated state at a temperature not lower than the melting point of polycaprolactone and the state at room temperature (about 25° C.) or less. At room temperature, polycaprolactone usually forms fine crystals and dispersed in the matrix comprising the tackifying polymer. Thus, the film adhesive has relatively high transparency, and the haze measured with a color difference meter is 5% or more (usually 20% or less). When polycaprolactone is molten and compatibilized with the tackifying polymer, the film adhesive becomes substantially transparent. If polycaprolactone is molten but is not compatibilized with the tackifying polymer, the haze does not substantially change. In such a case, the smaller haze means better compatibility. Accordingly, the haze of the film adhesive measured with the color difference meter is preferably 3% or less, more preferably 2% or less, when polycaprolactone and the tackifying polymer are in the compatibilized state.

The compatibility of polycaprolactone and the tackifying polymer can be simply judged by the transparency of a solution containing the two polymers. That is, one prerequisite for the good compatibility between the tackifying polymer and polycaprolactone is that a transparent mixture forms, when the first solution containing the dissolved tackifying polymer and the second solution containing the dissolved polycaprolactone are mixed.

The compatibility of the two polymers can be confirmed by checking the transmission of polarized light with a polarization microscope. As is well known, when the polarization axes of a pair of polarizing plates are crossed at right angles, no light passes, so that the view becomes substantially dark.

A pair of polarizing plates, that are arranged so that their polarization axes are crossed at right angles, are observed with inserting the film adhesive made of the adhesive composition of the present invention between them. At room temperature, the fine crystals of polycaprolactone rotate the polarizing plane of the light entering the film adhesive, and thus the light is allowed to pass through the both polarization plates. Since the directions of the crystal axes are usually random, polycaprolactone contains the crystals which rotate the polarization plane of the light just 90 degrees to allow the light to pass through the both polarization plates, and also the crystals that hardly allow the light to pass through the polarization plates. As the fine crystals of polycaprolactone are smaller and better dispersed, they have the larger compatibility with the tackifying polymer. Accordingly, as the compatibility of the both polymers increases, the crystal size decreases, and thus the entire film in the field of view of the microscope (100 to 200 times magnification) is observed faintly bright. When the compatibility of the polymers is low, the crystal size becomes large, and thus the crystals can be observed as bright spots that are sprinkled on the dark background. When polycaprolactone is molten and becomes compatible with the tackifying polymer, the polymer mixture contained in the film adhesive is optically isotropic, and is darker than at room temperature.

Examples of the tackifying polymer include acrylic polymers, nitrile-butadiene copolymers (NBR, etc.), styrenebutadiene copolymers (SBR, etc.), polyurethane, silicone polymers, etc. The tackifying polymers may be used singly or in admixture of two or more.

To increase the compatibility with polycaprolactone, the tackifying polymer preferably has (a) a hydroxyl group and (b) a phenyl group as essential functional groups in the molecule.

To impart the crosslinking properties, the tackifying polymer preferably has (c) a crosslinkable functional group as a further essential functional group. The crosslinkable functional group means a functional group which can participate in the crosslinking reaction when the polymer is heated or irradiated with electromagnetic waves (including UV ray) or electron beams, and usually a functional group which reacts with the crosslinking component contained in the adhesive composition. Alternatively, the molecules of the tackifying polymer may be directly crosslinked through the crosslinkable functional groups. The details of the crosslinkable functional groups and the crosslinking component will be explained in detail.

The above polymer having the essential functional groups in the molecule may be prepared by polymerizing a starting monomer mixture containing a monomer having a hydroxyl group in the molecule, a monomer having a phenyl group in the molecule and a monomer having a crosslinkable functional group in the molecule. Alternatively, the carboxyl groups in the polymer may be converted to hydroxyl groups and phenyl groups.

One preferable example of the acrylic polymer used in the present invention is explained.

Such a polymer is an acrylic polymer prepared by polymerizing a monomer mixture containing (A) a (meth)acrylic monomer having a hydroxyl group in the molecule, (B) a (meth)acrylic monomer having a phenyl group in the molecule, (C) a (meth)acrylic monomer having a crosslinkable functional group in the molecule, and (D) an alkyl acrylate having 4 to 10 carbon atoms in the alkyl group. Such a polymer may be prepared by any conventional polymerization method such as solution polymerization.

Examples of the monomer (A) include 2-hydroxyethyl acrylate, 2-hydroxypropyl acrylate, 2-hydroxymethyl acrylate, 2-hydroxyethyl methacrylate, 2-hydroxypropyl methacrylate, 2-hydroxy-3-phenoxyprop7yl acrylate, etc.

As the monomer (A), one having both a hydroxyl group and a phenyl group in the molecule such as 2-hydroxy-3-phenoxypropyl acrylate is preferable. With such a monomer (A), the compatibility of the tackifying polymer with polycaprolactone is effectively improved.

Examples of the monomer (B) include those having a phenoxy group as a phenyl group such as phenoxyethyl acrylate, phenoxypropyl acrylate, etc.

Examples of the monomer (D) include n-butyl acrylate, isobutyl acrylate, isooctyl acrylate, 2-ethylhexyl acrylate, etc. The monomer (D) has none of the above functional groups (a), (b) and (c).

As the monomer (C), unsaturated carboxylic acids such as (meth)acrylic acid; compounds having a thermally crosslinkable group such as epoxy group-containing (meth)acrylic monomers (e.g. glycidyl (meth)acrylate, etc.) and the like can be used. Furthermore, (meth)acrylic monomers having an unsaturated double bond and a photocrosslinkable functional group in the molecule are used to obtain a photocrosslinkable tackifying polymer. In this case, the monomer (C) having both a thermally crosslinkable group and a photocrosslinkable group may be used so that the tackifying polymer can be crosslinked with heat and light.

The total amount of the recurring units derived from the components (A) and (B) in the whole tackifying polymer is usually from 40 to 90 wt. %, preferably from 41 to 85 wt. %, in particular from 42 to 80 wt. %.

When the total amount of the recurring units derived from the components (A) and (B) is too low, the compatibility of the tackifying polymer with polycarolactone tends to decrease. When this total amount is too high and in turn the amount of the component having other functional group is too low, the crosslinkability or tackiness tends to decrease, and the desired properties may not be effectively improved. For example, the decrease of the crosslinkability may lead to the deterioration of the effect to prevent adhesive leavings. The decrease of the tackiness of the tackifying polymer may deteriorate the press-adhesion property, that is, the property to adhere an article to an adherent by pressing. When the press-adhesion property is regarded important, the total amount of the recurring units derived from the components (A) and (B) is preferably in the range between 42 and 60 wt. %.

The proportion of the recurring units derived from the monomer (B) in the whole recurring units of the tackifying polymer is usually at least 0.5 mole %, preferably at least 1 mole %, in particular from 5 to 25 mole %. When the proportion of the recurring units derived from the monomer (B) is too low, the compatibility of the tackifying polymer with polycaprolactone tends to decrease. When this proportion is too high, the press-adhesion property may deteriorate.

The proportion of the recurring units derived from the monomer (C) in the whole recurring units of the tackifying polymer is usually from 0.5 to 15 wt. %, preferably from 0.7 to 10 wt. %, in particular from 1 to 7 wt. %.

In addition to the polymers having the above essential functional groups, that is, the hydroxyl group, the phenyl group and the crosslinkable functional group, the tackifying polymer may be used in combination with a polymer that does not have such functional groups. However, the proportion of the polymers having the essential functional groups is at least 50 wt. %, preferably at least 60 wt. %, in particular at least 70 wt. %.

Other preferable example of the acrylic polymer to be used in the present invention is an acrylic polymer prepared by polymerizing (i) an alkyl acrylate mixture of 2-ethylhexyl acrylate, butyl acrylate and methyl acrylate, and (ii) acrylic acid or methacrylic acid. Such an acrylic polymer also has good compatibility with polycaprolactone. When such an acrylic polymer is used as a tackifying polymer, the adhesive composition preferably contain a crosslinking component reactive with the carboxyl group of (meth)acrylic acid (ii).

The proportion (weight percentage) of the recurring units derived from the monomers (i) in the whole recurring units of such a tackifying polymer is usually from 70 to 99 wt. %, preferably from 80 to 97 wt. %, in particular from 85 to 95 wt. %.

The proportion (weight percentage) of the recurring units derived from the monomers (ii) is usually from 0.5 to 30 wt. %, preferably from 2 to 20 wt. %, in particular from 4 to 15 wt. %.

The molecular weight of the tackifying polymer used in the present invention is not limited insofar as the adhesive composition can exert the desired adhesion force. In general, the weight average molecular weight of the tackifying polymer is from 10,000 to 1,000,000.

A tackifier may be used together with the tackifying polymer, like in the case of conventional pressure-sensitive adhesives.

Crosslinkable Functional Groups

The crosslinkable functional group of the tackifying polymer is preferably a functional group other than the hydroxyl group (a), which is reactive with the thermally crosslinking component. Preferably, the tackifying polymer has at least one of a carboxyl group and an epoxy group as the crosslinkable functional group, while it may have both of them.

In such a case, a preferred thermally crosslinking component is compound having at least two crosslinkable functional groups reactive with the carboxyl group and/or the epoxy groups of the tackifying polymer. Such a compound is usually a monomer or an oligomer.

Examples of the combination of the crosslinkable functional group and the thermally crosslikable component are as follows:

(1) When the crosslinkable functional group is the carboxyl group, the thermally crosslinking component is preferably a bisamide crosslinking agent or an epoxy resin.

(2) When the crosslinkable functional group is the epoxy resin, the thermally crosslinking component is preferably a rosin having a carboxyl group in the molecule (carboxyrosin).

Either the carboxyl group or the epoxy group can effect the thermal crosslinking without deteriorating the compatibilizing effects of the hydroxyl group and the phenyl group of the tackifying polymer with polycaprolactone. In addition, it is easy to achieve the sufficient crosslinking degree for the increase of the heat stability and the effect to prevent the adhesive leavings by the thermal crosslinking reaction.

In the case of the above (1), carboxyrosin may be used together, while in the case of the above (2), the epoxy resin and/or the bisamide crosslinking agent may be used together.

Crosslinking Components

The epoxy resin reacts with the carboxyl group of the tackifying polymer and functions to thermally crosslink the tackifying polymer. Examples of the epoxy resin include bisphenol A epoxy resins, bisphenol F epoxy resins, cresol-novolak epoxy resins, phenol-novolak epoxy resins, etc.

The epoxy equivalent of the epoxy resin is usually from 70 to 400, preferably from 80 to 300.

As the bisamide crosslinking agent, bisaziridine derivatives of dibasic acids such as isophthaloyl bis(2-methylaziridine) may be used. The bisamide crosslinking agent is particularly preferable since it can react with the tackifying polymer having the carboxyl group at room temperature and easily achieves the sufficient crosslinking degree.

When the tackifying polymer has the epoxy group in the molecule, preferable crosslinking components are carboxyrosins. The carboxyrosins have the carboxyl group in the molecule and react with the tackifying polymer. Thus, they function to thermally crosslink the tackifying polymer. As the carboxyrosin, gum rosin, wood rosin, tall oil rosin, and their chemically modified products (e.g. polymer rosin, etc.) may be used.

The carboxyrosins may be used singly or in admixture of two or more. Rosins having substantially no carboxyl group may be used together insofar as the effects of the present invention are not impaired.

When the above-described crosslinking component is used, the proportion of the crosslinking component in the whole adhesive composition (whole weight) is usually from 1 to 30 wt. %, preferably from 2 to 25 wt. %.

A reaction accelerator for the crosslinking component such as an epoxy resin may be compounded in the adhesive composition. Thereby, the thermal crosslinking conditions may be made mild.

The crosslinking components are not limited to those described above, and any other crosslinking component may be selected according to the kinds of the crosslinkable functional groups, crosslinking conditions, etc.

Preparation of Adhesive Composition

The adhesive composition of the present invention may be prepared by uniformly mixing the raw materials by a conventional mixing method. For example, the tackifying polymer, polycaprolactone, the crosslinking agent, the solvent, etc. are mixed with a mixing apparatus such as a homomixer, a planetary mixer, etc. to homogeneously dissolve or disperse the materials to obtain a liquid composition.

Such a liquid composition can be prepared in the form of a precursor solution containing the tackifying polymer and polycaprolactone by mixing the first solution comprising the dissolved tackifying polymer and the second solution comprising dissolved polycaprolactone. Then, the precursor solution is dried to obtain the adhesive composition consisting of the dried material of the precursor solution. In such a way, it is possible to form a specific morphology (interlinked structure) of crystalline polycaprolactone and the tackifying polymer having good compatibility with polycaprolactone, and thus the above-described properties (non-tackiness at room temperature and high adhesion force) can be most effectively achieved. When the crosslinking component is added, the third solution comprising the crosslinking component is added to the precursor solution.

For example, the above-prepared precursor solution is applied on a substrate and dried to form a film adhesive (or an adhesive layer) comprising the adhesive composition. As application means, conventional tools such as knife coaters, roll coaters, die coaters, bar coaters, etc. may be used.

As the substrate, a releasable substrate such as a liner, a substrate for an adhesive sheet (support), etc. may be used.

The drying of the applied precursor solution is usually carried out at a temperature of 60 to 180° C. The drying time is usually from several ten seconds to several minutes.

The thickness of the film adhesive is usually from 5 to 1,000 $\mu$m, preferably from 10 to 500 $\mu$m, in particular from 15 to 100 $\mu$m.

When the film adhesive according to the present invention is used by adhering it to a suitable adherent, the adhesion is completed by pressing the film adhesive to the adherent under a pressure of 1 to 50 kg/cm$^2$ (about 0.1 to 4.9 MPa) after laminating the film adhesive on the adherent. In the course of pressing, the initial adhesion force may be increased by heating and cooling (spontaneous cooling). In this case, the heating conditions are not limited. In general, the heating temperature is from 60 to 120° C., and the heating time is from 30 seconds to 5 minutes.

The film adhesive according to the present invention may be used as the adhesive layer of an adhesive sheet.

Thermally Easy Peelable Adhered Structure

The adhesive composition of the present invention has the thermally easy-peeling properties. Thus, it can form an adhesive structure having the following construction:

A thermally easy peelable adhered structure comprising (1) an adherent, (2) an adhesive layer consisting of the adhesive composition of the present invention adhered to the surface of the adherent, and (3) an article fixed to the adhesive layer. In this structure, at any desired time, the article can be peeled off from the adherent by heating the structure to the specific temperature without leaving any adhesive on the adherent. Those having coated surfaces as the adhering surfaces may be used.

Examples of the adherent to be used include adherents having the surfaces (adhering surfaces) made of (1) metals such as aluminum, stainless steel, copper, zinc-plated steel plate, etc., (2) resins such as polyimide, acrylic resins, polyurethane, melamine resins, epoxy resins, vinyl chloride resins, etc., and (3) inorganic oxide materials such as ceramics, etc.

Examples of the articles include parts such as electronic parts, machine parts, optical parts, etc., and substrates for the above-described adhesive sheets, and so on.

In the thermally easy peelable adhered structure of the present invention, the combination of the adhesive layer and the substrate is usually the thermally easy-peeling adhesive sheet (including an adhesive tape and a film adhesive). Such a thermally easy-peeling adhesive sheet comprises a sheet-form substrate having a surface and a back surface opposing the surface, and an adhesive layer consisting of the above-described adhesive composition fixed to the back surface of the substrate, and is used by being adhered to the surface of the adherent through the adhesive layer.

The adhesive layer comprising the adhesive composition has substantially no tackiness at room temperature. Thus, it has good ease of slide, and therefore the positioning of the adhesive sheet in relation to the adherent is very easy in the adhering process. In the meantime, after the positioning, the adhesive sheet can be fixed to the adherent by simply pressing or by heat pressing followed by cooling. The adhesive sheet, which can be easily positioned and press adhered, is preferably used as an adhesive sheet having a relatively large area (in general, at least 400 cm$^2$) (e.g. interior or exterior decorative sheets), or relatively, large-size retroreflective sheets for marking. Furthermore, the adhesive sheet of the present invention can be used as an application tape or film, since it can be peeled off at any time by heating without the adhesive leavings.

As the substrate of the adhesive sheet, any conventionally used substrate (support), for example, paper, metal films, polymer films, etc. may be used.

Examples of the polymers of the polymer films include polyimide, polyvinyl chloride, acrylic polymers, polyesters (e.g. polyethylene terephthalate, etc.), polyurethane, polyolefin polymers (including ethylene copolymers), and so on.

The substrate may be one allowing visible light or UV rays to transmit there-through, or one reflecting light like a retroreflective sheet. Also, the substrate may be colored or decorated by printing, etc. In such cases, the adhesive sheet having the adhesive layer of the adhesive composition of the present invention is useful as a decorative sheet or a marking film.

The adhering surface of the adhesive layer is usually protected with a liner. The liner may be made of a paper sheet, a plastic film, or a laminate of a paper sheet and a plastic film.

In the case of the thermally easy-peeling adhesive sheet, the adhesion between the adhesive layer and the substrate is preferably as strong as possible. If the adhesion between the adhesive layer and the substrate is weak, a part or whole of the adhesive layer is left on the adhering surface of the adherent, when the adhesive sheet is peeled off from the adherent. To increase the adhesion between the adhesive layer and the substrate, a primer is applied to the surface of the substrate on which the adhesive layer is placed.

Preferably, the polymer constituting the substrate film comprises at least one of polyurethane and an ethylene-acrylic acid copolymer, since such a polymer film can be strongly adhered to the adhesive layer of the adhesive composition of the present invention without the use of a primer.

The thickness of the substrate is usually from 5 to 500 $\mu$m, preferably from 10 to 300 $\mu$m, and the thickness of the adhesive layer is usually from 10 to 500 $\mu$m, preferably from 15 to 300 $\mu$m, in particular from 20 to 100 $\mu$m.

Furthermore, the adhesive layer may contain any one of conventional additives, insofar as the effects of the present invention are not impaired. Examples of such additives include viscosity modifiers, defoaming agents, leveling agents, UV ray absorbers, antioxidants, pigments, fungicides, elastic fine particles of tacky or non-tacky rubbery polymers, tackifiers, catalysts to accelerate the crosslinking reaction, etc.

When the adhesive sheet is thermally peeled off, it is usually heated at a temperature of 60 to 120° C. for 30 seconds to 5 minutes. Since the adhesive layer of the adhesive composition according to the present invention is used, the easy-peeling time lasts at least 5 minutes after the heating to peel the adhesive sheet.

Preferably, the easy-peeling condition may be maintained even when the adherent and the adhesive layer are cooled to room temperature (about 25° C.), but the adhesion force (peel strength) again increases after 15 minutes from cooling to finish the readhesion.

In the course of the thermal peeling, the adherent and/or the adhesive sheet may be heated with a heating apparatus such as an iron, a drier, an IR (far IR) lamp, etc. When the substrate comprises a metal foil, the adhesive sheet may be heated by an electromagnetic induction heating method. Furthermore, the adherent and/or the adhesive sheet may be heated with a heat transfer medium such as a liquid or steam.

The peel strength of the adhesive sheet prior to heating for peeling off is usually at least 10 N/25 mm, preferably from 12 to 40 N/25 mm, in particular from 13 to 22 N/25 mm, when it is measured by the 180 degrees peeling test at a peeling rate of 300 mm/min. When the peel strength prior to the thermal peeling process is too low, the adhesive sheet may not be used in the same way as conventional adhesive sheets. When the peel strength prior to the thermal peeling process is too high, the peel strength in the thermal peeling process is too high, and thus the easy-peeling properties may not be improved.

An optimum range of the peel strength in the thermal peeling process can be suitably selected according to the mechanical strength of the substrate (e.g. elastic modulus, elongation at break, etc.), peeling conditions (e.g. peeling rate), and so on. From the viewpoint of quick peeling, the peel strength is preferably 15 N/25 mm or less, when it is measured by the 180 degrees peeling test at a peeling rate of 300 mm/min.

As can be seen from the above explanations, the above-described adhesive sheet (1) achieves the easily peelable state by heating it to a specific temperature to decrease the peel strength to a value smaller than that prior to heating, on a desired occasion after it is adhered to an adherent, (2) can maintain such an easily peelable state for a certain period of time, (3) can be peeled off without leaving the adhesive on the adherent, and (4) can be easily readhered to an adherent (including other adherent) after peeling.

EXAMPLES

Example 1

The adhesive composition of this Example was prepared as follows:

A composition solution was prepared by mixing a solution containing a tackifying polymer, which was produced as described below (solvent: a mixture of 85 wt. % of ethyl acetate and 15 wt. % of methyl ethyl ketone; nonvolatile concentration: 30 wt. %), a solution of under-mentioned polycaprolactone in toluene (nonvolatile concentration: 35 wt. %) and isophthaloyl bis(2-methylaziridine) as a thermally crosslinking bisamide. The proportions of these components were such that tackifying polymer:polycaprolactone: crosslinking component=70:30:0.2 (weight ratio of the nonvolatiles). The obtained mixed solution was transparent.

The composition solution was applied on a release surface of a paper liner having a silicone-coated release surface and dried in an oven at 95° C. for 5 minutes to form an adhesive layer (film adhesive) consisting of the adhesive composition of this Example on the liner.

This adhesive layer and a polyurethane film having a thickness of 33 μm as a substrate were adhered each other by pressing to obtain the adhesive sheet of this Example.

The thickness of the adhesive layer was 30 μm.

The used polycaprolactone was PLACCEL® HIP (available from Daicel Chemical Industries, Ltd.; weight average molecular weight Mw=25,000, melting point Tm=60° C.), which is represented by "PCL1" in Table 1.

The tackifying polymer was a copolymer prepared by solution polymerizing the monomer mixture containing (A) a monomer having a phenoxy group and a hydroxyl group in the molecule (2-hydroxy-3-phenoxypropyl acrylate (represented by HPPA; ARONICS® M-5700 available from TOAGOSEI Co., Ltd.), (B) a monomer having a phenoxy group in the molecule (phenoxyethyl acrylate (represented by PEA; BISCOAT® #192 available from OSAKA YUKIKAGAKU KOGYO KABUSHIKIKAISHA), (C). acrylic acid (represented by AA; available from Wako Pure Chemical Industries, Ltd.), and (D) n-butyl acrylate (represented by BA) available from TOAGOSEI Co., Ltd.). The ratio of PEA:HPPA:BA:AA in the tackifying polymer (TAP1 in Table 1) was 30:15:50:5.

Example 2

An adhesive sheet of this Example was produced in the same manner as in Example 1 except that a tackifying polymer having the following composition (TAP2 in Table 1) was used.

The ratio of PEA:HPPA:EHA:AA in the tackifying polymer was 30:15:50:5, in which EHA represents 2-ethylhexyl acrylate.

Example 3

An adhesive sheet of this Example was produced in the same manner as in Example 1 except that PLACCEL® 220N (available from Daicel Chemical Industries, Ltd.; weight average molecular weight Mw=3,800, melting point Tm=50° C.), which is represented by PCL 2 in Table 1, was used as polycaprolactone.

Example 4

An adhesive sheet of this Example was produced in the same manner as in Example 3 except that TAP2 used in Example 2 was used as a tackifying polymer.

Comparative Examples 1 and 2

Adhesive sheets used in Comparative Examples 1 and 2 were SCOTCHCAL® JS 1000A (available from 3M, USA) and SCOTCHCAL® 3650PR (available from 3M, USA), respectively. These adhesive sheets comprise an adhesive layer containing no polycaprolactone.

The properties of the adhesive sheets produced or used in the above examples were evaluated as follows:

Evaluation Methods

Peel Strength

A test piece (150 mm×25 mm) formed from the adhesive sheet of each example was press adhered to an adherent (a stoved melamine coated plate available from NTP) at 20° C. according to JIS Z 0237 8.2.3.

"Ordinary State 1" means a 180 degree peel strength measured with TENSILON at a peeling rate of 300 mm/min. along the lengthwise direction after maintaining the sample at 20° C. for 48 hours from the adhesion.

"Heat Peel" means a peel strength measured by the same method as above after heating the adhered test piece up to about 100° C. by blowing hot air using an industrial drier against the substrate surface of the test piece, and then spontaneously cooling it for 5 minutes.

The percentage in the brackets in Table 1 is a retention percentage of the peel strength after spontaneous cooling in comparison with the peel strength of Ordinary State 1.

"Ordinary state 2" means a peel strength measured by the same method as above after heating the adhered test piece in the same way as in the evaluation of "Heat Peel", and then spontaneously cooling it for 15 minutes.

Slidability

At a temperature of 20° C., a test piece was placed on the above adherent so that the adhesion surface of the adhesive layer was in contact with the adhesion surface of the adherent. Then, whether the test piece could be easily moved horizontally or not was evaluated with the hand feeling. When the test piece could be slid with substantially no resistance, it was ranked "Good (symbol: O)", while when the sliding was difficult due to the high resistance caused by adhesion to the adherent, it was ranked "No good (symbol: X)".

Adhesive Leavings

The surface of the adherent was visually evaluated after the peel strength test in the heat peel mode. When no adhesive leavings were observed, it was ranked "Good (symbol: O)", when the adhesive leavings were partially observed, it was ranked "Normal (symbol: Δ)", and when the adhesive leavings were observed over the whole surface, it was ranked "No good (symbol: x)".

The results are shown in Table 1.

TABLE 1

| | Tackifying polymer/ polycapro- lactone | Slida- bility | Peel strength (N/25 mm) | | | Adhesive leavings |
|---|---|---|---|---|---|---|
| | | | Ordi- nary state 1 | Heat peel | Ordi- nary state 2 | |
| Ex. 1 | TAP1/PCL1 | O | 19 | 8 (42%) | 22 | O |
| Ex. 2 | TAP2/PCT1 | O | 16 | 9 (56%) | 19 | O |
| Ex. 3 | TAP1/PCL2 | O | 18 | 4 (22%) | 17 | O |
| Ex. 4 | TAP2/PCT2 | O | 18 | 5 (27%) | 17 | O |
| Ex. 5 | TAP3/PCT2 | — | 17 | 9 (53%) | 19 | O |
| Ex. 6 | TAP3/PCL2 | — | 20 | 5 (26%) | 19 | O |

TABLE 1-continued

| | Tackifying polymer/ polycaprolactone | Slidability | Peel strength (N/25 mm) | | | Adhesive leavings |
| | | | Ordinary state 1 | Heat peel | Ordinary state 2 | |
|---|---|---|---|---|---|---|
| Ex. 7 | TAP1/PCL2 (90:10) | — | 15 | 10 (65%) | — | ○ |
| Ex. 8 | TAP1/PCL2 (80:20) | — | 14 | 9 (64%) | — | ○ |
| C.E. 1 | No polycaprolactone | X | 29 | 30 (103%) | 31 | Δ |
| C.E. 2 | No polycaprolactone | X | 23 | 23 (100%) | 24 | ○ |

From the above results, the following conclusions can be reached:

In Examples 1 to 4, the slidability was good, and the high adhesion force (peel strength) of at least 16 N/25 mm was attained after 48 hours from the press adhesion. Furthermore, the adhesive leaving was few after peeling.

In Examples 1 and 2, the adhesion force decreased to about 50% after the heat peel process, and the adhesive tapes could maintain the easy peeling state for at least 5 minutes. In the meantime, after 15 minutes elapsed, the adhesion force recovered the level prior to heating. In Examples 3 and 4, the adhesion force decreased to about 30% or less after the heat peel process, and the adhesive tapes could maintain the easy peeling state for at least 5 minutes. In the meantime, after 15 minutes elapsed, the adhesion force recovered the level prior to heating.

In Comparative Example 2, the evaluation of the adhesive leavings after peeling was better than Comparative Example 1. However, neither Comparative Example 1 nor 2 could achieve the thermally easy-peeling properties.

Example 5

An adhesive sheet of this Example was produced in the same manner as in Example 3 except that an adhesive AST 8167 (available from Nippon Shokubai Co., Ltd.; represented by TAP3 in Table 1) was used as a solution containing tackifying polymer. In the used tackifying polymer, the ratio of EHA:BA:MA:AA was 3.8:49.7:10:6.5, in which MA represents methyl acrylate, and other symbols are the same as described above.

A test piece (150 mm×25 mm) formed from the adhesive sheet was press adhered to the same adherent as that used in Example 1, and heated at 85° C. for 1 minute to complete the adhesion.

After maintaining the adhered sample at room temperature for 2 hours, a 180 degree peel strength was measured with TENSILON at a peeling rate of 300 mm/min. This result is included in the column of "Ordinary State 1" of Table 1.

After maintaining the adhered sample at room temperature for 2 hours, a peel strength was measured by the same method as above after heating the adhered test piece up to about 100° C. by blowing hot air using an industrial drier against the substrate surface of the test piece, and then spontaneously cooling it for 5 minutes. This result is included in the column of "Heat Peel" in Table 1.

"Ordinary state 2" means a peel strength measured by the same method as above after heating the adhered test piece in the same way as in the evaluation of "Heat Peel", and then spontaneously cooling it for 15 minutes.

The results are also shown in Table 1. In addition, the evaluation result of adhesive leavings is also shown in Table 1.

Example 6

An adhesive sheet of this Example was produced in the same manner as in Example 5 except that, after the formation of the adhesive layer on the liner and the press fixing of the substrate on the adhesive layer, the adhesive layer was heated at 85° C. for 1 minute and then aged at 20° C. for 1 hour.

A test piece (150 mm×25 mm) formed from the adhesive sheet was press adhered to the same adherent as that used in Example 1, and heated at 85° C. for 1 minute to complete the adhesion.

After maintaining the adhered sample at room temperature for 24 hours, a 180 degree peel strength was measured with TENSILON at a peeling rate of 300 mm/min. This result is included in the column of "Ordinary State 1" of Table 1.

After maintaining the adhered sample at room temperature for 24 hours, a peel strength was measured by the same method as above after heating the adhered test piece up to about 100° C. by blowing hot air using an industrial drier against the substrate surface of the test piece, and spontaneously cooling it for 1 minute. This result is included in the column of "Heat Peel" in Table 1.

"Ordinary state 2" means a peel strength measured by the same method as above after heating the adhered test piece in the same way as in the evaluation of "Heat Peel", and then spontaneously cooling it for 15 minutes.

The results are also shown in Table 1. In addition, the evaluation result of adhesive leavings is also shown in Table 1.

Example 7

An adhesive sheet of this Example was produced in the same manner as in Example 3 except that the ratio of the tackifying polymer:polycaprolactone:crosslinking component was changed to 90:10:0.2 (weight ratio of the nonvolatiles), and then it was evaluated by the same manners as in Example 1. The results of the evaluations are shown in Table 1.

Example 8

An adhesive sheet of this Example was produced in the same manner as in Example 3 except that the ratio of the tackifying polymer:polycaprolactone:crosslinking component was changed to 80:20:0.2 (weight ratio of the nonvolatiles), and then it was evaluated by the same manners as in Example 1. The results of the evaluations are shown in Table 1.

What is claimed is:

1. An adhesive composition comprising:
   (I) from about 55 to about 95 percent by weight of a tackifying polymer; and
   (II) from about 4 to about 40 percent by weight of a crystalline polymer, said percents by weight being based on a total weight of the adhesive composition;
   wherein the crystalline polymer comprises polycaprolactone and the tackifying polymer comprises a polymer that (i) is compatible with the polycaprolactone at first temperature that is equal to or above the melting point of the polycaprolactone, (ii) is crosslinked and (ii) has a hydroxyl functional group and a phenyl functional group therein.

2. The adhesive composition according to claim 1, wherein said tackifying polymer further comprises a crosslinkable functional group, said crosslinkable functional group being crosslinkable to (i) molecules of tackifying polymer, (ii) an optional crosslinking component, or (ii) both.

3. The adhesive composition according to claim 1, wherein said tackifying polymer is formed by polymerizing (i) a first monomer having a hydroxyl group therein, (ii) a second monomer having a phenyl group therein, and (ii) a third monomer having a crosslinkable functional group therein.

4. The adhesive composition according to claim 1, wherein said tackifying polymer is an acrylic polymer obtained by polymerizing a monomer mixture containing (a) a first (meth)acrylic monomer having a hydroxyl group therein, (b) a second (meth)acrylic monomer having a phenyl group therein, (c) a third (meth)acrylic monomer having a crosslinkable functional group therein, and (d) an alkyl acrylate having 4 to 10 carbon atoms in the alkyl group.

5. The adhesive composition according to claim 1, wherein said tackifying polymer is formed by polymerizing a first monomer having a hydroxyl group and a phenyl group therein.

6. The adhesive composition according to claim 1, wherein the tackifying polymer has from about 40 to about 90 percent by weight of recurring units containing a hydroxyl group, a phenyl group, or both.

7. The adhesive composition according to claim 2, wherein the crosslinkable functional group comprises a carboxyl group, an epoxy group, or both.

8. The adhesive composition according to claim 2, further comprising a crosslinking component.

9. The adhesive composition according to claim 7, wherein the crosslinkable functional group comprises a carboxyl group, and the adhesive composition further comprises a crosslinking component comprising a bisamide crosslinking agent or an epoxy resin.

10. The adhesive composition according to claim 7, wherein the crosslinkable functional group comprises an epoxy group, and the adhesive composition further comprises a crosslinking component comprising a carboxyrosin.

11. The adhesive composition according to claim 2, wherein the adhesive composition comprises a transparent mixture of molten in tackifying polymer at the first temperature, and has a first temperature haze of less than about 3% as measured with a color difference meter at the first temperature.

12. An adhered structure comprising an adherent, an adhesive layer comprising the adhesive composition according to claim 1, and an article adhered to said adhesive layer, wherein said article is peelable from the adherent at or above the first temperature without leaving adhesive on said adherent.

13. An adhesive composition comprising:
  (I) from about 4 to about 40 percent by weight of a crystalline polycaprolactone having a melting point ranging from about 30° C. to about 70° C.; and
  (II) from about 55 to about 95 percent by weight of a tackifying polymer that (i) is crosslinked with itself, with an optional crosslinking component, or both, and (ii) is not crosslinked to the polycaprolactone, said percents by weight being based on a total weight of the adhesive composition;
  wherein the adhesive composition (a) has a reduced peel strength property at a first temperature that is equal to or above the melting point of the polycaprolactone compared to an adhesive composition peel strength at room temperature, (b) maintains a reduced peel strength property for a period of time after being cooled from the first temperature, (c) is peelable from an adherent at the first temperature such that the adhesive composition is removed from the adherent without leaving an adhesive residue, and (d) has readhesion properties at room temperature after cooling below the first temperature.

14. The adhesive composition according to claim 13, wherein the tackifying polymer has a hydroxyl functional group, a phenyl functional group, and optionally, a crosslinkable functional group thereon.

15. The adhesive composition according to claim 14, wherein the tackifying polymer has a crosslinkable functional group thereon, and the crosslinkable functional group comprises a carboxyl group, an epoxy group, or both.

16. The adhesive composition according to claim 14, further comprising a crosslinking component.

17. An adhered structure comprising an adherent, an adhesive layer comprising the adhesive composition according to claim 14, and an article adhered to said adhesive layer, wherein said article is peelable from the adherent at or above the first temperature without leaving adhesive on said adherent.

18. An adhered structure comprising an adherent, an adhesive layer on the adherent, and an article adhered to the adhesive layer, wherein the adhesive layer comprises:
  (I) from about 4 to about 40 percent by weight of a crystalline polycaprolactone; and
  (II) from about 55 to about 95 percent by weight of a tackifying polymer that (i) is crosslinked with itself, with an optional crosslinking component, or both, and (ii) is not crosslinked to the polycaprolactone, said percents by weight being based on a total weight of the adhesive composition;
  wherein the adhesive composition (a) has a reduced peel strength property at a first temperature that is equal to or above the melting point of the polycarprolactone compared to an adhesive composition peel strength at room temperature, (b) maintains a reduced peel strength property for a period of time after being cooled from the first temperature, (c) is peelable from the adherent at the limit temperature such that the adhesive composition is removed from the adherent without leaving an adhesive residue, and (d) has readhesion properties to the adherent at room temperature after cooling below the first temperature.

19. The adhered structure according to claim 18, wherein said tackifying polymer is an acrylic polymer obtained by polymerizing a monomer mixture containing (a) a first (meth)acrylic monomer having a hydroxyl group therein, (b) a second (meth)acrylic monomer having a phenyl group therein, (c) a third (meth)acrylic monomer having a crosslinkable functional group therein, and (d) an alkyl acrylate having 4 to 10 carbon atoms in the alkyl group.

20. The adhered structure according to claim 18, wherein said period of time is at least 5 minutes.

* * * * *

UNITED STATES PATENT AND TRADEMARK OFFICE
CERTIFICATE OF CORRECTION

PATENT NO. : 6,946,177 B2
DATED : September 20, 2005
INVENTOR(S) : Abe, Hidetoshi It is certified that error appears in the above-identified patent and that said Letters Patent is hereby corrected as shown below:

<u>Title page,</u>
Item [54], Title, after "WHICH" insert -- IS --.
Item [56], References Cited, OTHER PUBLICATIONS,
"JP59-096160" reference, after "GB;" insert -- Class A12, --.
"JP06-145621" reference, after "GB;" insert -- Class A14 --.

<u>Column 7,</u>
Line 55, delete "2-hydroxy-3-phenoxyprop7yl acrylate" and insert -- 2-hydroxy-3-phenoxypropyl acrylate --.

<u>Column 8,</u>
Line 4, after "monomers (e.g." insert -- , --.

<u>Column 16,</u>
Line 67, after "at" insert -- a --.

<u>Column 17,</u>
Line 2, after "crosslinked" insert -- , --.
Lines 2 and 14, after "and" delete "(ii)" and insert -- (iii) --.
Line 9, after "or" delete "(ii)" and insert -- (iii) --.
Line 49, after "molten" insert -- polycaprolactone --.

<u>Column 18,</u>
Line 45, delete "polycarprolactone" and insert -- polycapralactone --.
Line 50, delete "limit" and insert -- first --.

Signed and Sealed this

Twenty-eighth Day of March, 2006

JON W. DUDAS
*Director of the United States Patent and Trademark Office*